United States Patent
Bin ABDULLAH et al.

(10) Patent No.: US 12,490,728 B2
(45) Date of Patent: Dec. 9, 2025

(54) OSCILLATING MECHANISM FOR SPINNING REEL AND SPINNING REEL WITH OSCILLATING MECHANISM

(71) Applicant: Shimano Inc., Osaka (JP)

(72) Inventors: Muhammad Syahmi Sulhi Bin ABDULLAH, Osaka (JP); Lin Boon Gan, Osaka (JP); Yik Hui Chan, Osaka (JP)

(73) Assignee: Shimano Inc., Osaka (JP)

( * ) Notice: Subject to any disclaimer, the term of this patent is extended or adjusted under 35 U.S.C. 154(b) by 158 days.

(21) Appl. No.: 18/132,100

(22) Filed: Apr. 7, 2023

(65) Prior Publication Data
US 2023/0345925 A1 Nov. 2, 2023

(30) Foreign Application Priority Data
May 2, 2022 (JP) .................................. 2022-075860

(51) Int. Cl.
*A01K 89/01* (2006.01)
*A01K 89/015* (2006.01)

(52) U.S. Cl.
CPC .............................. *A01K 89/01912* (2015.05)

(58) Field of Classification Search
CPC .......... A01K 89/0192; A01K 89/01142; A01K 89/0114; A01K 89/01141
See application file for complete search history.

(56) References Cited

U.S. PATENT DOCUMENTS

| | | | |
|---|---|---|---|
| 10,631,529 B2 * | 4/2020 | Chan | A01K 89/0186 |
| 2018/0255756 A1 * | 9/2018 | Saito | F16H 55/17 |

FOREIGN PATENT DOCUMENTS

| CN | 1436455 A | * | 8/2003 | ......... A01K 89/0114 |
|---|---|---|---|---|
| CN | 1640250 A | * | 7/2005 | ......... A01K 89/0114 |
| DE | 102018204951 A1 | * | 12/2018 | ............ A01K 89/01 |
| DE | 102021213569 A1 | * | 6/2022 | ........... A01K 89/006 |
| EP | 1332670 A1 | * | 8/2003 | ......... A01K 89/0114 |
| EP | 1510126 A1 | * | 3/2005 | ......... A01K 89/0114 |
| EP | 2784353 A1 | * | 10/2014 | ............ A01K 89/00 |
| JP | 2002101792 A | * | 4/2002 | ......... A01K 89/0114 |
| JP | 2005151885 A | * | 6/2005 | |
| JP | 2018201483 A | * | 12/2018 | ........... A01K 89/015 |
| JP | 2019-187342 A | | 10/2019 | |
| KR | 20040018985 A | * | 3/2004 | ......... A01K 89/0114 |
| KR | 20060080147 A | * | 7/2006 | ......... A01K 89/0114 |

* cited by examiner

*Primary Examiner* — Emmanuel M Marcelo
(74) *Attorney, Agent, or Firm* — Global IP Counselors, LLP (57) ABSTRACT

An oscillating mechanism for a spinning reel that moves a spool shaft in a spool shaft direction in conjunction with a rotation of a handle shaft includes a sliding gear, a cam gear and a slider. The sliding gear rotates in conjunction with the rotation of the handle shaft. The cam gear has a gear portion formed from metal that includes a gear body configured to mesh with the sliding gear and a boss protruding from the gear body, and a resin support portion supporting a radially inward side of the gear portion and configured to rotate integrally with the gear portion. The slider is mounted on the spool shaft and includes an engagement groove in which the boss is configured to engage and which is configured to move the spool shaft in the spool shaft direction by moving the boss along the engagement groove.

9 Claims, 8 Drawing Sheets

OSCILLATING MECHANISM FOR SPINNING REEL AND SPINNING REEL WITH OSCILLATING MECHANISM

CROSS-REFERENCE TO RELATED APPLICATIONS

This application claims priority to Japanese Patent Application Nos. 2022-75860, filed on May 2, 2022. The entire disclosure of Japanese Patent Application No. 2022-75860 are hereby incorporated by reference.

BACKGROUND

Technical Field

The present disclosure relates to an oscillating mechanism for a spinning reel and a spinning reel equipped with oscillating mechanism.

Background Information

A conventional oscillating mechanism is disclosed in the spinning reel of Japanese Laid-Open Patent Application No. 2019-187342. The conventional oscillating mechanism has a sliding gear that rotates in conjunction with the rotation of the handle shaft, a metal cam gear that meshes with the sliding gear, and a slider that includes an engagement groove. The cam gear includes a gear body that meshes with the sliding gear and a boss that protrudes from the gear body. The boss engages with an engagement groove in the slider. As the boss moves along the engagement groove, the spool moves back and forth via the spool shaft.

SUMMARY

In conventional oscillating mechanisms, because the cam gear meshes with the sliding gear, the cam gear must be strong and rigid. For this reason, cam gears are generally made of metal. For example, cam gears are formed of a single metal member. Therefore, if a spinning reel has an oscillating mechanism, the weight of the spinning reel may increase.

It has been determined that in conventional oscillating mechanisms because the cam gear meshes with the sliding gear, the cam gear must be strong and rigid. For this reason, cam gears are generally made of metal. For example, cam gears are formed of a single metal member. Therefore, if a spinning reel has an oscillating mechanism, the weight of the spinning reel can increase.

Moreover, in Japanese Laid-Open Patent Application No. 2019-187342, the gear body of the cam gear is formed by a gear portion and a body portion that is provided on the inner circumferential side of the gear portion and that supports the gear portion, thereby reducing the weight. Here, the boss is configured to protrude from the body portion. Since the boss moves along the engagement groove, the body portion must be strong. Thus, there is a limit to the weight reduction of the body portion. That is, if a spinning reel has an oscillating mechanism, there is a risk that the weight of the spinning reel will increase.

An object of the present disclosure is to provide an oscillating mechanism that is configured to reduce the weight of a spinning reel.

An oscillating mechanism for a spinning reel according to one aspect of the present disclosure moves the spool shaft in the direction of the spool axis in conjunction with the rotation of the handle shaft. The oscillating mechanism comprises a sliding gear, a cam gear, and a slider. The sliding gear rotates in conjunction with the The cam gear has a metal gear portion and a resin support portion. The metal gear portion includes a gear body that meshes with the sliding gear and a boss that protrudes from the gear body. The resin support portion supports the radially inward side of the gear portion and rotates integrally with the gear portion.

The slider is mounted on the spool shaft. The slider includes an engagement groove engaged by the boss. As the boss moves along the engagement groove, the slider moves the spool shaft in the direction of the spool axis.

In this oscillating mechanism, to ensure the strength and rigidity required for meshing with the sliding gear, the gear portion of the cam gear, for example, the gear body and the boss, are made of metal. Also, since the support portion of the cam gear is formed from resin, the weight of the oscillating mechanism is reduced. That is, the use of this oscillating mechanism makes it possible to provide a spinning reel having a reduced weight.

In an oscillating mechanism for a spinning reel of a second aspect according to the first aspect of the present disclosure, it is preferable that the gear portion include a first engagement part that protrudes radially inwardly from the gear body. The support portion includes a first concave part that opens radially outwardly and is configured to engage the first engagement part.

In this oscillating mechanism, by engagement of the first engagement part of the gear portion with the first concave part of the support portion, the gear portion and the support portion can be rotated integrally with a simple configuration.

In an oscillating mechanism for a spinning reel of a third aspect according to the second aspect of the present disclosure, it is preferable that the boss protrude from the first engagement part in the direction of the cam gear axis.

In this oscillating mechanism, by having the boss protrude from the first engagement part in the axial direction of the cam gear, the boss can be securely engaged in the engagement groove.

In an oscillating mechanism for a spinning reel of a fourth aspect according to the second or third aspect of the present disclosure, it is preferable that the support portion have a body portion that is disposed on the radially inward side of the gear portion and that supports the gear portion, and a flange that extends radially outwardly from the body portion and that is disposed on an axially outer side surface of the gear portion. The first concave part is provided on the body portion and the flange.

In this oscillating mechanism, since the flange of the support portion is disposed on the axially outer side surface of the gear portion, the body portion of the support portion can be easily positioned in the axial direction of the cam gear on the radially inward side of the gear portion. In addition, since the first concave part is disposed in the body portion and the flange, the gear portion and the support portion can be securely rotated integrally.

In an oscillating mechanism for a spinning reel of a fifth aspect according to any one of the second to fourth aspects of the present disclosure, it is preferable that the gear portion include a second engagement part that protrudes radially inwardly from the gear body in a different position from that of the first engagement part. The support portion includes a second concave part that opens radially outwardly and engages the second engagement part.

In this oscillating mechanism, by engaging the second engagement part of the gear portion with the second concave part of the support portion, the gear portion and the support portion can be integrally rotated with a simple configuration.

In an oscillating mechanism for a spinning reel of a sixth aspect according to the fifth aspect of the present disclosure, it is preferable that the support portion have a body portion that is disposed on the radially inward side of the gear portion and that supports the gear portion, and a flange that extends radially outward from the body portion and that is disposed on an axially outer side surface of the gear portion. The second concave part is disposed on the body portion.

In this oscillating mechanism, since the flange of the support portion is disposed on the axially outer side surface of the gear portion, the body portion of the support portion can easily be positioned in the axial direction of the cam gear on the radially inward side of the gear portion. Moreover, since the second concave part is disposed in the body portion, the gear portion and the support portion can be securely integrally rotated.

In an oscillating mechanism for a spinning reel of a seventh aspect according to any one of the first to sixth aspects of the present disclosure, it is In this oscillating mechanism, because the gear portion includes zinc, the strength and rigidity of the cam gear is ensured.

In an oscillating mechanism for a spinning reel of an eighth aspect according to any one of the first to seventh aspects of the present disclosure, it is preferable that the support portion includes a polyoxymethylene resin and/or a polyacetal resin.

In this oscillating mechanism, since the support portion includes a polyoxymethylene resin and/or a polyacetal resin, the weight of the cam gear can be suitably reduced.

A spinning reel according to a ninth aspect of the present disclosure comprises a reel body, a spool shaft mounted so as to be movable in a front-rear direction with respect to the reel body, a handle shaft that is supported so as to be rotatable with respect to the reel body, and the oscillating mechanism described above.

In this spinning reel, the oscillating mechanism described above can be used to achieve a reduction in weight.

The embodiments set forth in the present disclosure provide a spinning reel in which the weight of the oscillating mechanism is reduced. Accordingly, as can be understood the overall weight of a spinning reel is reduced.

FIRST EMBODIMENT

Figure 1:
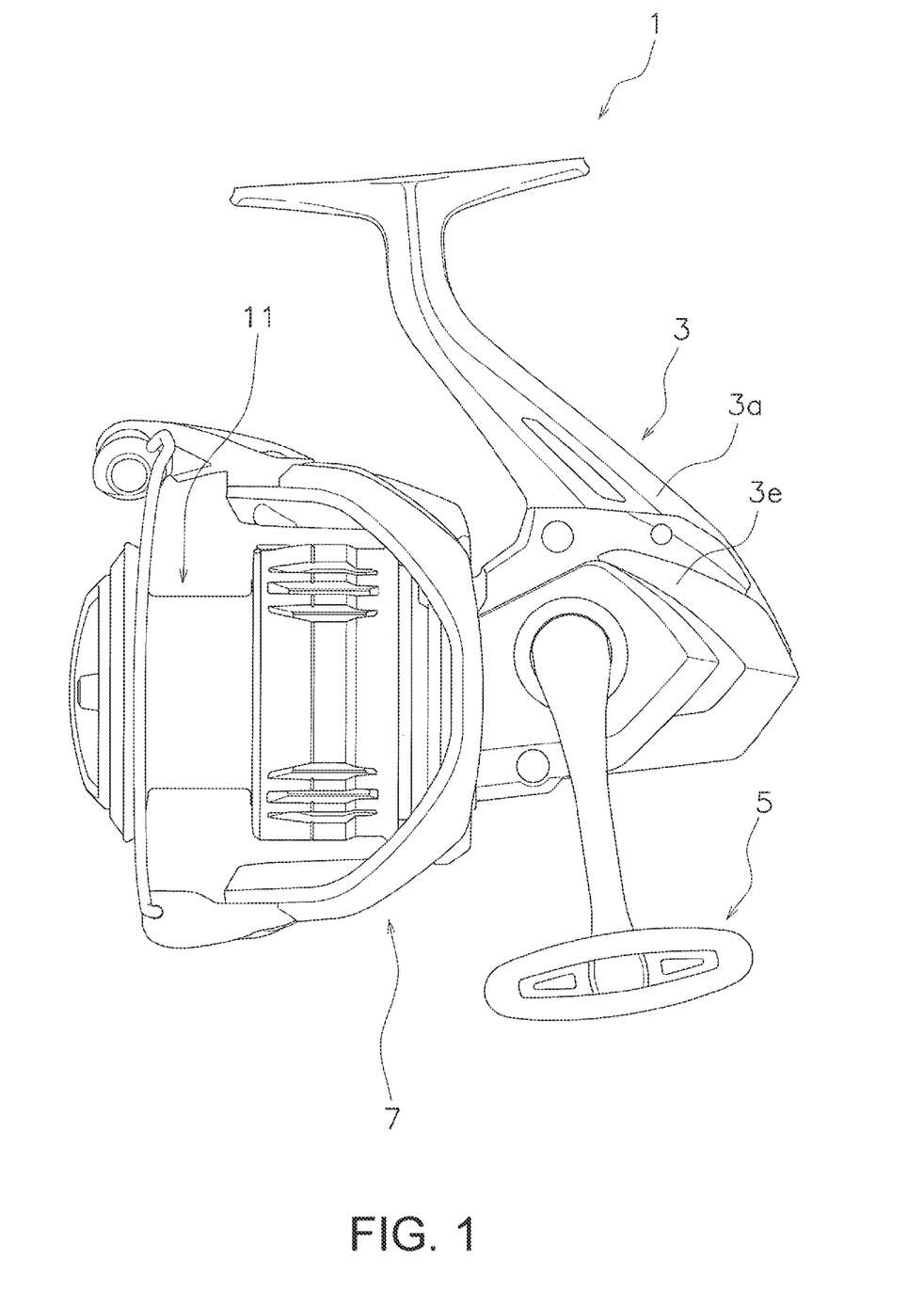
FIG. 1 is a side view of a spinning reel according to a first embodiment of the present invention.
Figure 2:
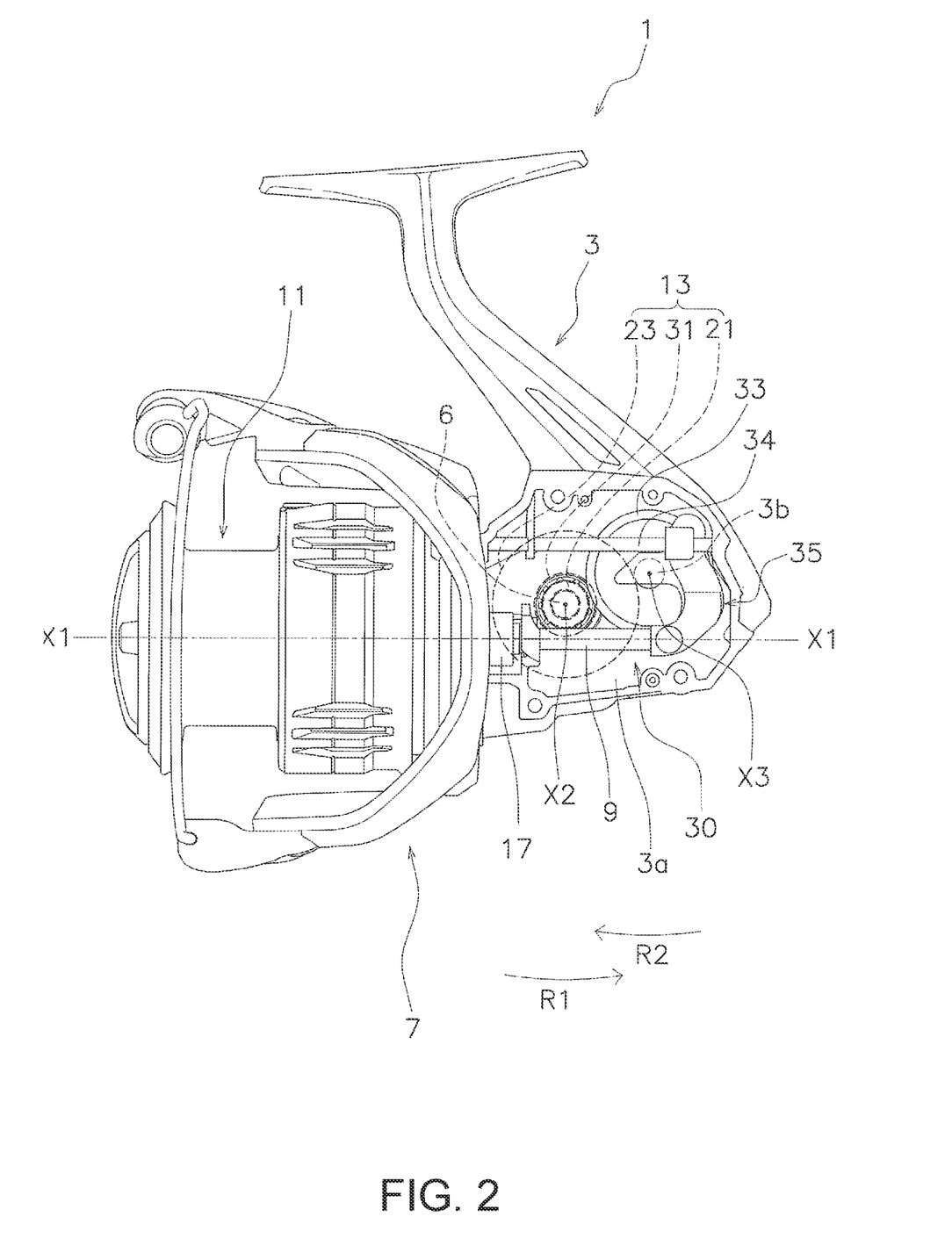
FIG. 2 is a side view in which the side cover and drive unit are removed from the spinning reel.

As shown in FIG. 1, a spinning reel 1 employing one embodiment of the present disclosure comprises a reel body 3, a handle 5, a rotor 7, a spool 11, a drive unit 13 (see FIG. 2), and an oscillating mechanism 30 (see FIG. 2).

As shown in FIG. 1, the handle 5 is supported by the reel body 3 so as to be rotatable. In the present embodiment, an example is shown in which the handle 5 is positioned on the left side of the reel body 3. The handle 5 can be positioned on the right side of the reel body 3. As shown in FIG. 2, the oscillating mechanism 30 for moving the spool 11 back and forth is disposed in the interior space of the reel body 3.

The rotor 7 shown in FIGS. 1 and 2 is used to wind fishing line onto the spool 11. The rotor 7 is located at the front of the reel body 3 and is configured so as to be rotatable with respect to the reel body 3. For example, the rotor 7 is connected to a pinion gear 17 so as to be integrally rotatable with the pinion gear 17, and the pinion gear 17 is rotatably supported by the reel body 3.

Fishing line can wound around the spool 11 shown in FIGS. 1 and 2. The spool 11 is configured to move integrally with a spool shaft 9. For example, as shown in FIG. 2, the spool 11 is mounted on the front end portion of the spool shaft 9.

The spool shaft 9 shown in FIG. 2 is configured to be movable back and forth with respect to the reel body 3. The spool shaft 9 is supported so as to be movable in the direction of the spool axis with respect to the reel body 3. The spool axis direction is the direction in which spool axis X1 of the spool shaft 9 extends. The spool axis direction can be interpreted as the front-rear direction.

The spool shaft 9 is inserted through the inner circumferential portion of the cylindrical pinion gear 17. The spool shaft 9 moves in reciprocating fashion in the spool axis direction with respect to the reel body 3 by the operation of the oscillating mechanism 30.

As shown in FIG. 2, the drive unit 13 has a drive shaft 21, a drive gear 23, and a sliding gear 31. The drive shaft 21 rotates in conjunction with the rotation of the handle 5. For example, a handle shaft 6 of the handle 5 is attached to the drive shaft 21.

The drive shaft 21 has a drive axis X2, and in one example, the drive shaft 21 is formed in a cylindrical shape. The handle shaft 6 is attached to the inner circumferential portion of the drive shaft 21 so as to be detachable and is supported by the reel body 3 so as to be rotatable. The axis of the handle shaft 6 is concentric with the drive axis X2. The drive gear 23 is disposed on the drive shaft 21 and is configured to rotate the rotor 7. The drive gear 23 meshes with the pinion gear 17.

The sliding gear 31 is configured to move the spool shaft 9 and is rotate in a first direction of rotation R1 in conjunction with the rotation of the handle shaft 6. The sliding gear 31 is disposed on the drive shaft 21 separate from the drive gear 23 in the axial direction in which the drive axis X2 extends. The spool shaft 9 and a guide shaft 34 (described further below) are located between the drive gear 23 and the sliding gear 31. The sliding gear 31 meshes with a cam gear 33, described further below.

The drive shaft 21, the drive gear 23, and the sliding gear 31 are integrally formed; however, the drive shaft 21, the drive gear 23, and the sliding gear 31 can be formed separately from one another. The drive shaft 21, the drive gear 23, and the sliding gear 31 rotate in conjunction with the rotation of the handle shaft 6, and when the drive gear 23 and the sliding gear 31 rotate, the pinion gear 17 and the cam gear 33 rotate.

For example, in the present embodiment, the direction of rotation in which the handle shaft 6, the drive shaft 21, the drive gear 23, and the sliding gear 31 rotate to wind the fishing line is defined as the first direction of rotation R1. The direction of rotation opposite to the first direction of rotation R1 is defined as the second direction of rotation R2.

The first and second directions of rotation R1 and R2 are defined for the drive axis X2 and an axis X3, respectively.

When the handle shaft 6, the drive shaft 21, drive gear 23, and the sliding gear 31 rotate with respect to the drive axis X2 in the first direction of rotation R1, the cam gear 33 rotates with respect to axis X3 in the second direction of rotation R2.

Figure 3:
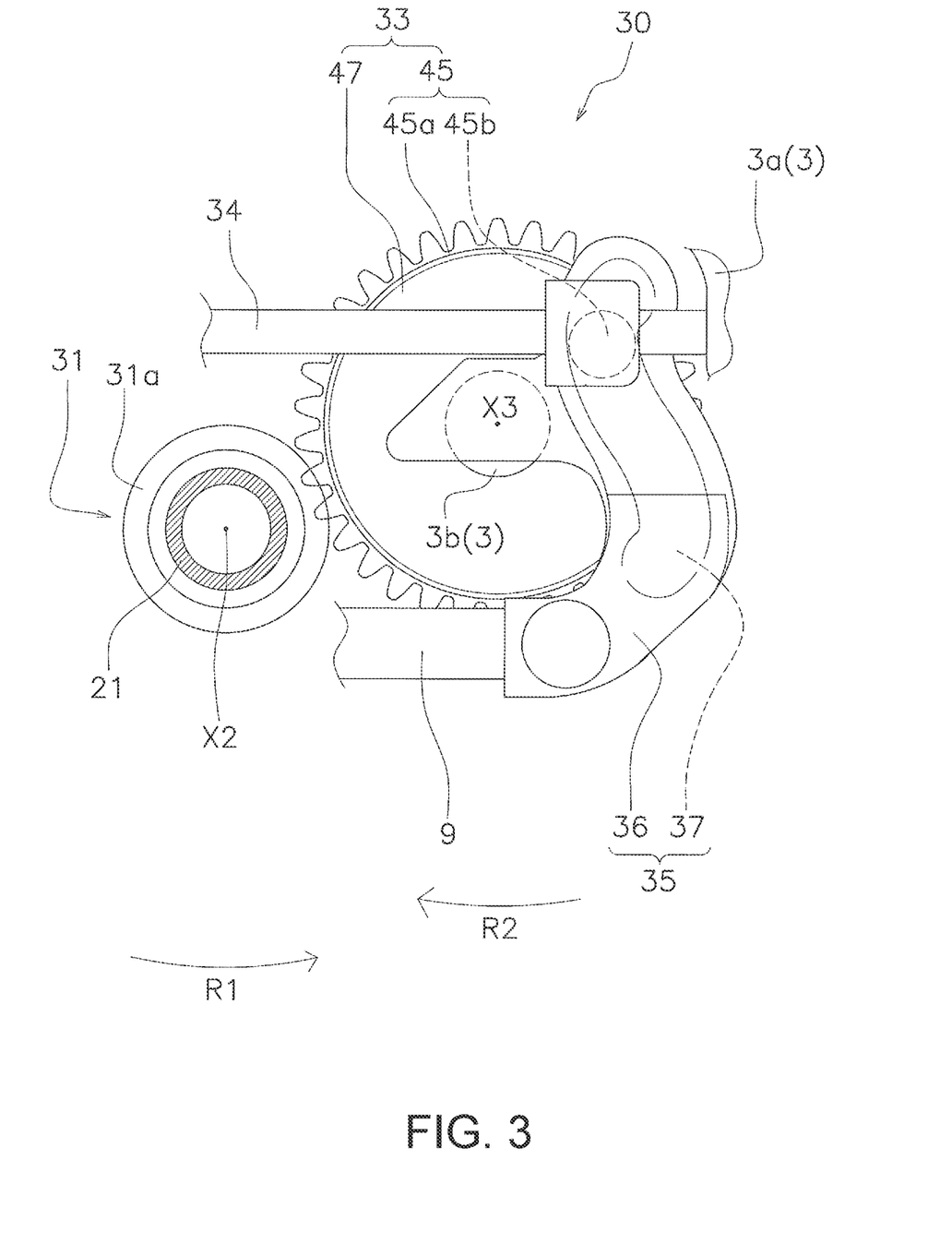
FIG. 3 is a partially enlarged side view of the oscillating mechanism.

The oscillating mechanism 30 shown in FIG. 2 moves the spool shaft 9 in the direction of the spool axis in conjunction with the rotation of the handle shaft 6. As shown in FIG. 3, the oscillating mechanism 30 includes the sliding gear 31, the cam gear 33, the guide shaft 34, and a slider 35.

As described above, the sliding gear 31 constitutes the drive unit 13. In FIG. 3, the toothed portion 31a of the sliding gear 31 are shown in a simplified manner. The toothed portion 31a includes a plurality of gear teeth. The cam gear 33 is used to move the slider 35 in the direction of the spool axis. The cam gear 33 is supported by the reel body 3 so as to be rotatable, and in one example, the cam gear 33 is positioned between the reel body 3 and the slider 35. The cam gear 33 is supported by a first boss 3b of the reel body 3 so as to be rotatable.

As shown in FIGS. 2 and 3, the first boss 3b is included in the reel body 3. That is, the reel body 3 has a body portion 3a, the first boss 3b, and a side cover 3e (see FIG. 1). The body portion 3a and the side cover 3e form a space for arranging the oscillating mechanism 30.

Figure 4:
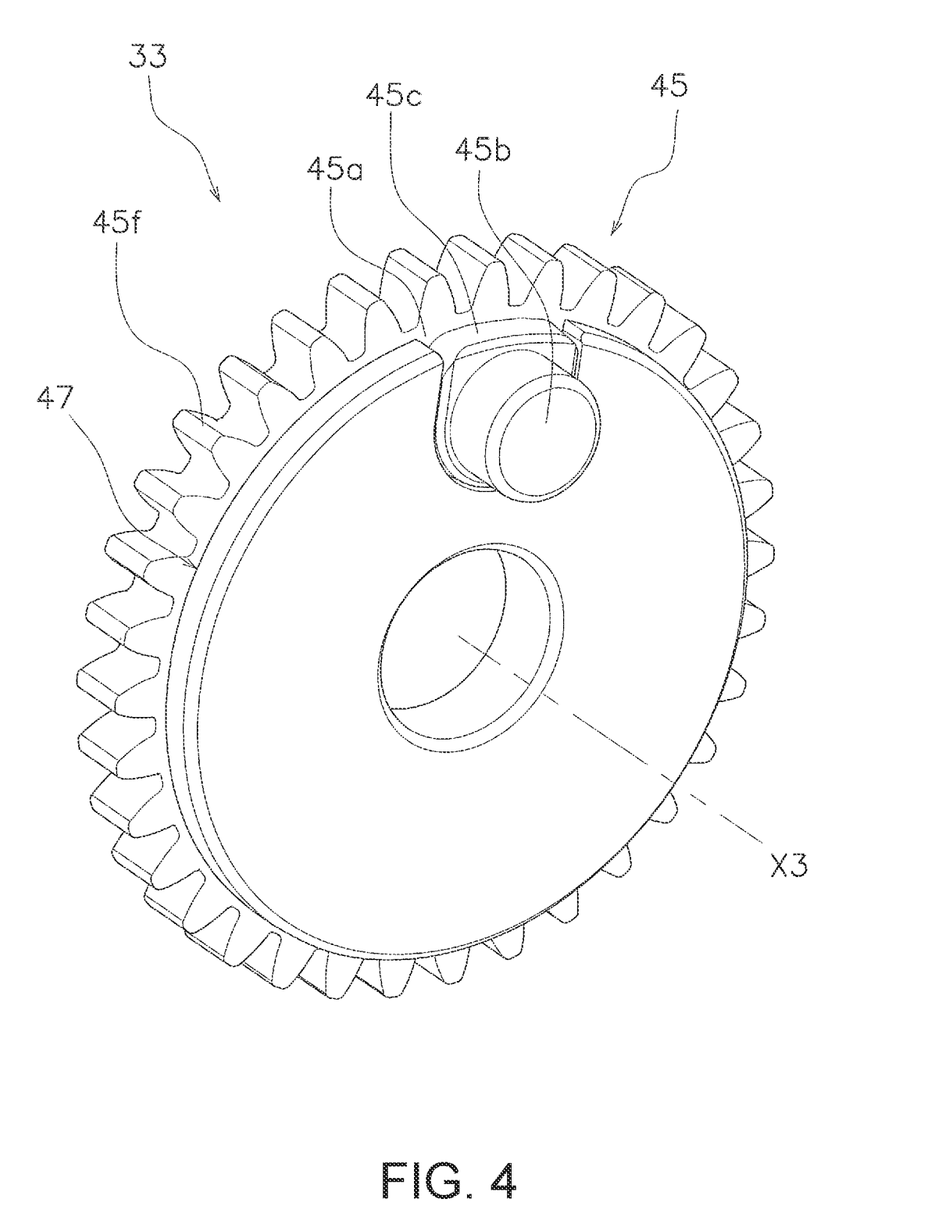
FIG. 4 is a front perspective view of the cam gear.

As shown in FIG. 4, the cam gear 33 has a gear portion 45 that can be made of metal and a support portion 47 that can be made of resin. The gear portion 45 is formed from a metal, which can include zinc. As can be understood, it is preferable that the metal be an alloy that contains zinc.

Figure 5:
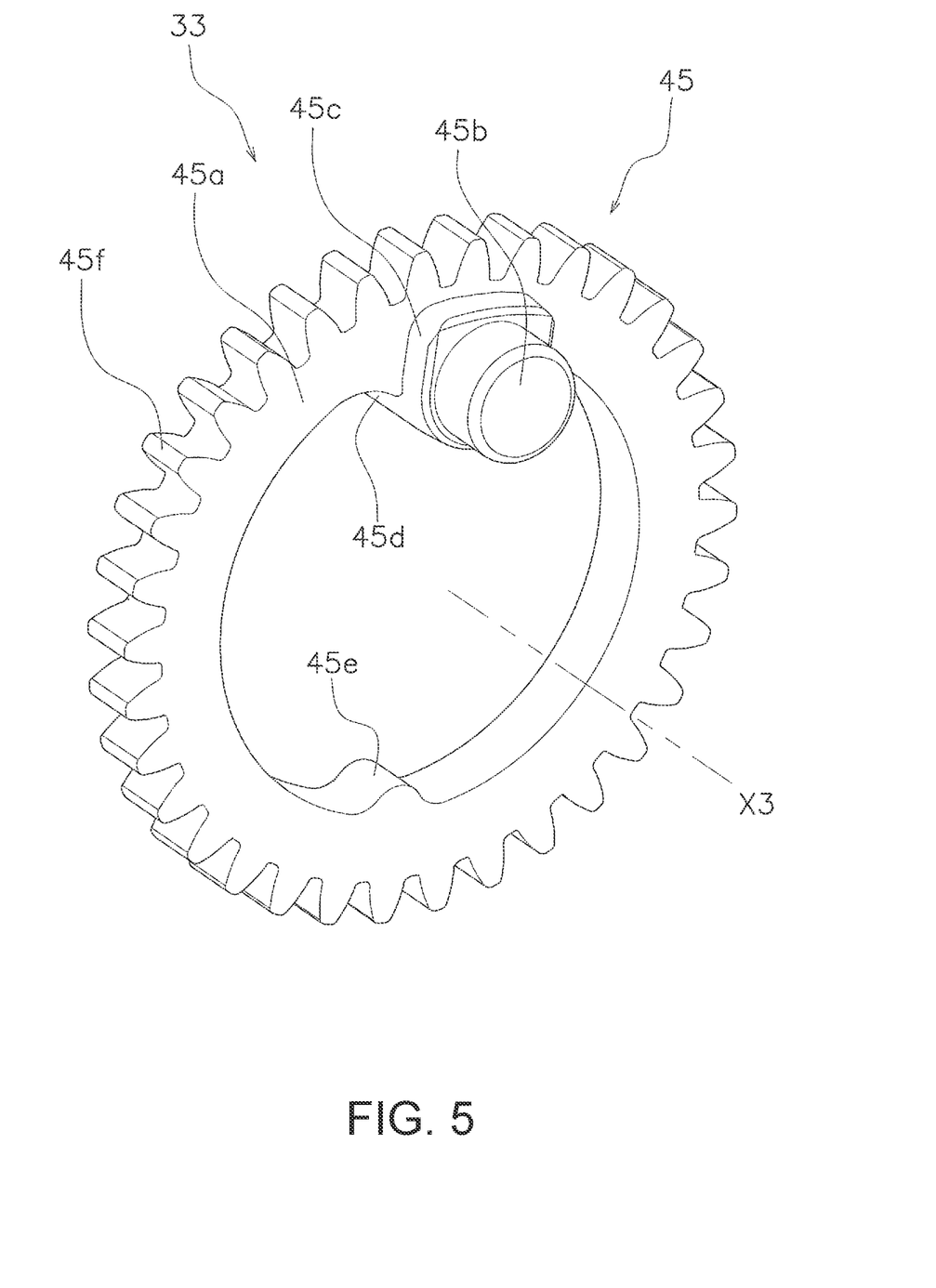
FIG. 5 is a front perspective view of the gear portion.
Figure 6:
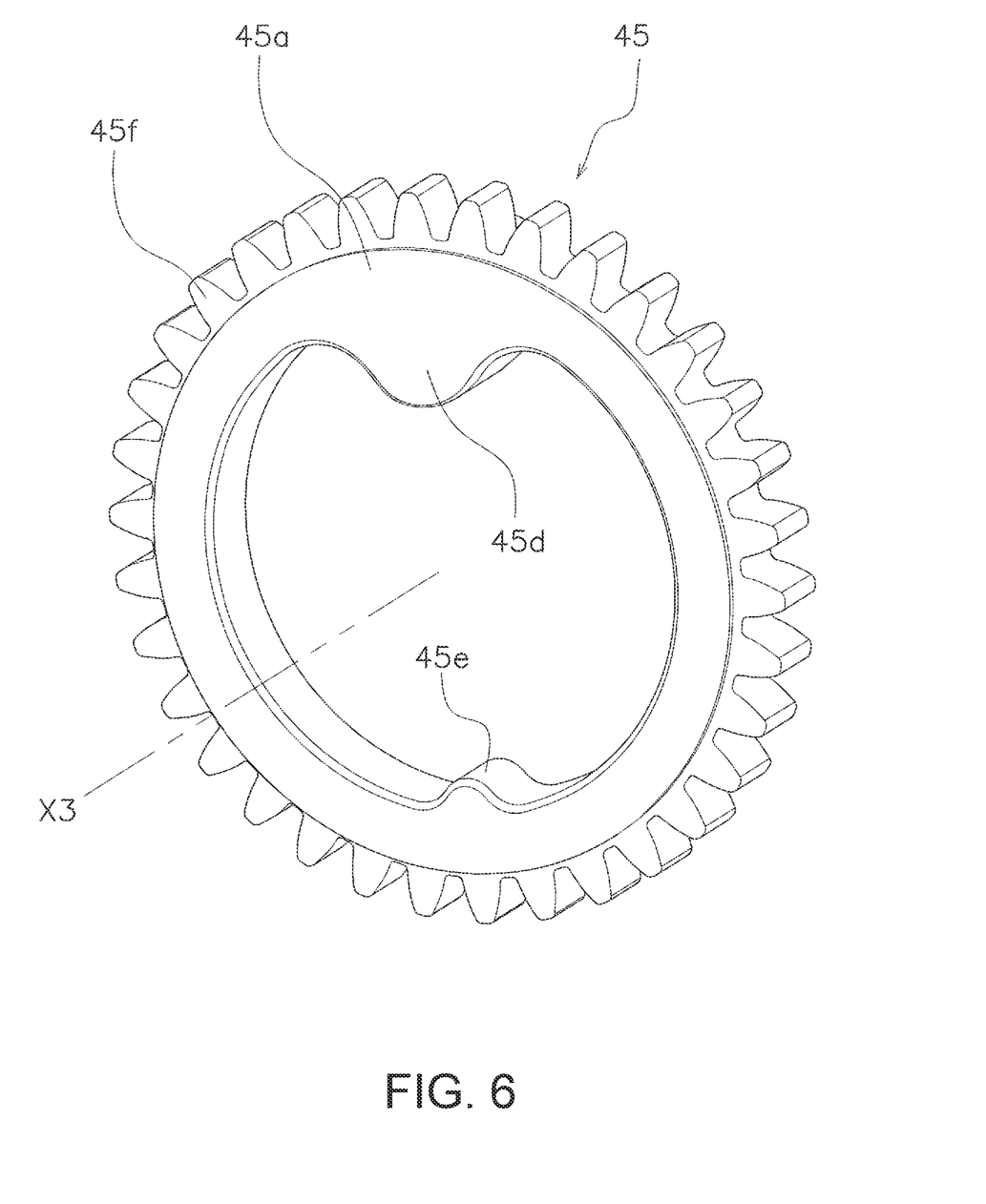
FIG. 6 is a rear perspective view of the gear portion.

As shown in FIG. 5, the gear portion 45 includes a gear body 45a and a second boss 45b (one example of a boss). The gear portion 45 also includes a first protruding part 45c, a second protruding part 45d (one example of a first engagement part), and a third protruding part 45e (one example of a second engagement part).

The gear body 45a meshes with the sliding gear 31, and in one example, the gear body 45a is an essentially annular form. A toothed part 45f is disposed on the outer circumferential portion of the gear body 45a. The toothed part 45f includes a plurality of gear teeth and meshes with the toothed part 31a (see FIG. 3) of the sliding gear 31.

As shown in FIG. 5, the first protruding part 45c protrudes from the gear body 45a in the axial direction of the cam gear. For example, the first protruding part 45c protrudes from the outside surface of the gear body 45a in the axial direction of the cam gear. The first protruding part 45c is formed integrally with the gear body 45a. The second protruding part 45d protrudes radially inwardly from the gear body 45a. For example, the second protruding part 45d protrudes inwardly from the inner circumferential surface of the gear body 45a in the radial direction of the cam gear. The second protruding part 45d is formed integrally with the first protruding part 45c and the gear body 45a.

The third protruding part 45e protrudes radially inwardly from the gear body 45a in a different position from that of the second protruding part 45d. For example, the third protruding part 45e protrudes inwardly from the inner circumferential surface of the gear body 45a in the radial direction of the cam gear. The third protruding part 45e is formed integrally with the gear body 45a.

As shown in FIG. 5, the second boss 45b protrudes from the gear body 45a. For example, the second boss 45b protrudes from the first protruding part 45c in the axial direction of the cam gear. Specifically, the second boss 45b protrudes from the outer surface of the first protruding part 45c in the axial direction of the cam gear. The second boss 45b is formed integrally with the first protruding part 45c. The second boss 45b engages an engagement groove 37 of the slider 35, described further.

As shown in FIG. 3, the second boss 45b, while being positioned in the engagement groove 37, moves along the engagement groove 37 in conjunction with the rotation of the gear body 45a. The second boss 45b has a cylindrical form. In the present embodiment, an example is shown in which the second boss 45b has a cylindrical form, but the second boss 45b can be in the form of a circular truncated cone.

Figure 7:
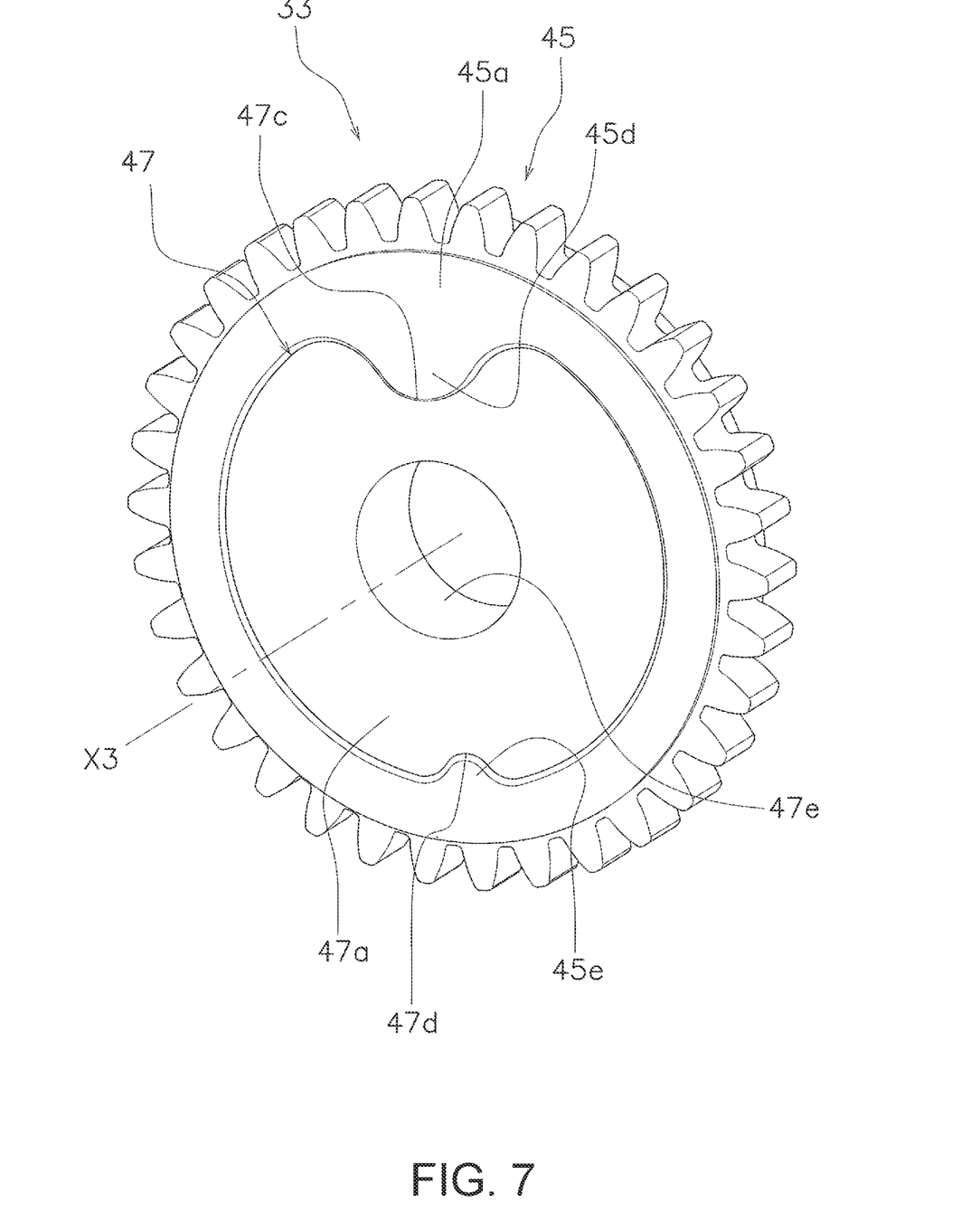
FIG. 7 is a rear perspective view of the cam gear.

The support portion 47 shown in FIGS. 4 and 7 is made from a resin. The resin includes polyoxymethylene resin and/or polyacetal resin. It is preferable that the resin be a synthetic resin that contains polyoxymethylene resin and/or polyacetal resin.

The support portion 47 is supported by the reel body 3 so as to be rotatable about axis X3. As shown in FIG. 7, the support portion 47 supports the radially inward side of the gear body 45a. For example, the support portion 47 supports the inside surface of the gear body 45a in the radial direction of the cam gear. The support portion 47 rotates integrally with the gear body 45a.

Figure 8:
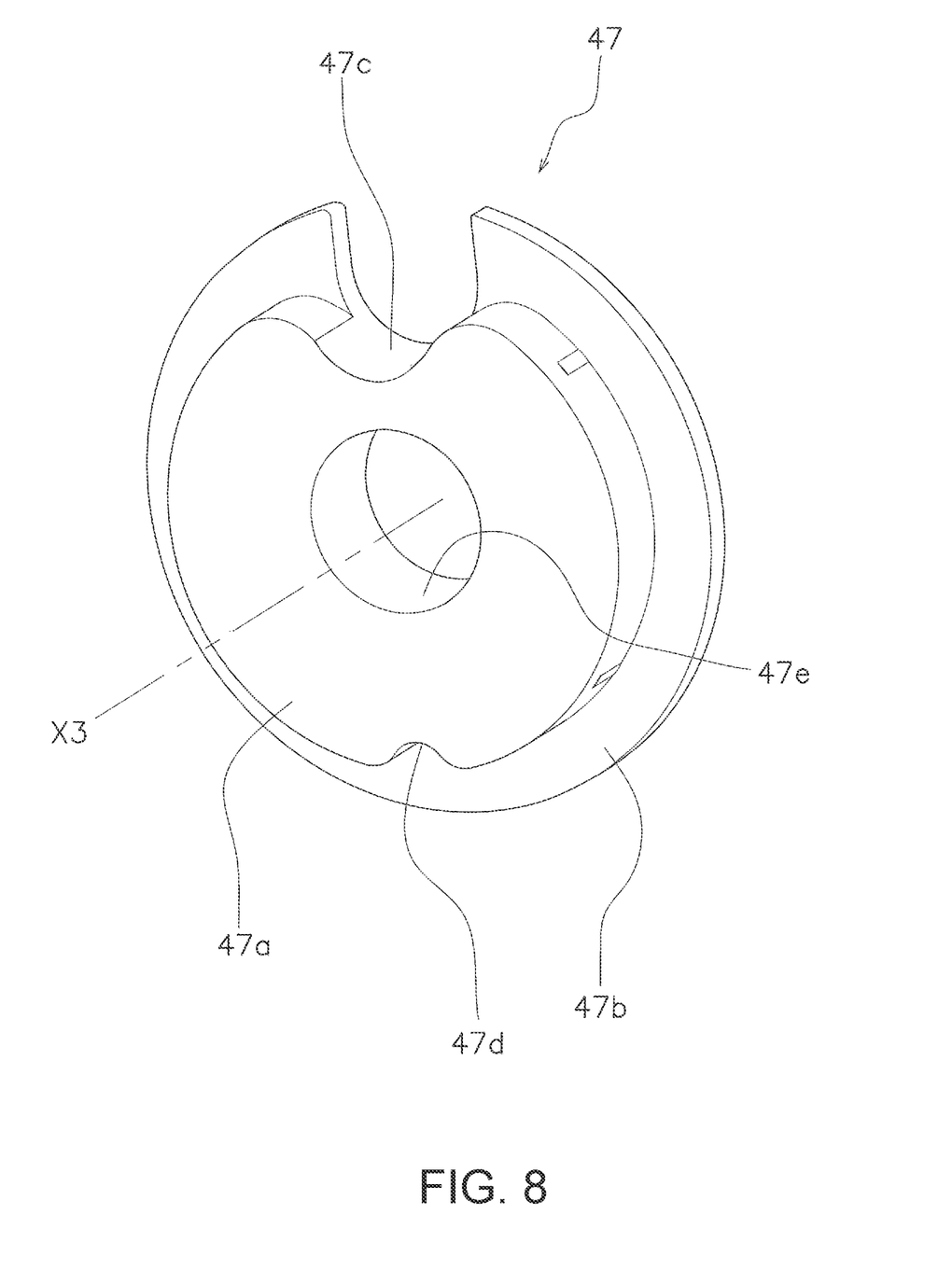
FIG. 8 is a rear perspective view of the support portion.

As shown in FIG. 8, the support portion 47 includes a body portion 47a and a flange 47b. The support portion 47 also includes a first concave part 47c and a second concave part 47d, and a hole 47e.

As shown in FIGS. 7 and 8, the body portion 47a supports the gear body 45a. The body portion 47a is disposed on the radially inward side of the gear body 45a. For example, the body portion 47a is disposed on the inside of the gear body 45a in the radial direction of the cam gear. The body portion 47a has an essentially annular form. The body portion 47a is press-fitted to the inner circumferential surface of the gear body 45a.

As shown in FIG. 8, the flange 47b extends radially outwardly from the body portion 47a and is disposed opposite the outer side surface of the gear body 45a in the axial direction. For example, the flange 47b contacts the outer side surface of the gear body 45a in the axial direction of the cam gear. The outer side surface of the gear body 45a is the surface of the side on which the second boss 45b is formed. The flange 47b has an essentially annular form.

The first concave part 47c is disposed on the body portion 47a and the flange 47b. The first concave part 47c opens radially outward. The second protruding part 45d (see FIG. 5) engages the first concave part 47c. For example, the first protruding part 45c (see FIGS. 4 and 5) and the second protruding part 45d (see FIG. 5) engage the first concave part 47c. The second concave part 47d is disposed on the body portion 47a. The second concave part 47d opens radially outward. As shown in FIG. 7, the third protruding part 45e engages the second concave part 47d.

As shown in FIG. 8, the first boss 3b (see FIGS. 2 and 3) of the reel body 3 is disposed in the hole 47e. Axis X3 passes through the center of the hole portion 47e.

As shown in FIGS. 2 and 3, the guide shaft 34 is used to guide the slider 35 in the direction of the spool shaft. The guide shaft 34 is arranged above the spool shaft 9. The guide shaft 34 is arranged parallel to the spool shaft 9 (spool axis X1) and is fixed to the reel body 3 (body portion 3a).

As shown in FIG. 3, the slider 35 is configured to move the spool shaft 9 in the direction of the spool axis. The slider 35 is mounted on the spool shaft 9. For example, the slider 35 has a slider body 36 and the engagement groove 37. The slider body 36 is fixed to a rear end of the spool shaft 9. The guide shaft 34 is inserted through the slider body 36. The slider body 36 moves along the guide shaft 34 in the direction of the spool axis.

The second boss 45b engages the engagement groove 37. The engagement groove 37 is disposed in the slider body 36. For example, with the slider body 36 mounted on the spool shaft 9 and the guide shaft 34, the engagement groove 37 extends upward from the spool shaft 9.

As shown in FIG. 3, when the engagement groove 37 is viewed from the handle 5 side in the axial direction in which the drive axis X2 extends, the engagement groove 37 is formed in a curved shape. For example, in this embodiment, the engagement groove 37 is formed in an S shape. The second boss 45b engages the engagement groove 37. As the second boss 45b moves along the engagement groove 37, the slider body 36 moves the spool shaft 9 along the guide shaft 34 in the spool axis direction.

The oscillating mechanism 30 of the spinning reel 1 described above has the following features. In the oscillating mechanism 30, the gear portion 45 of the cam gear 33, for example, the gear body 45a and the second boss 45b, are made of metal, thereby securing the strength and rigidity required for meshing with the sliding gear 31. In addition, since the support portion 47 of the cam gear 33 is formed from a resin, the weight of the oscillating mechanism 30 can be reduced. That is, by using the oscillating mechanism 30, the weight of the spinning reel 1 can be reduced.

In the oscillating mechanism 30, by the engagement of the first protruding part 45c of the gear part 45 with the first concave part 47c of the support portion 47, the gear portion 45 and the support portion 47 can be rotated integrally with a simple configuration.

In the oscillating mechanism 30, by having the second boss 45b protrude from the first protruding part 45c in the axial direction of the cam gear, the second boss 45b can be securely engaged in the engagement groove 37.

In the oscillating mechanism 30, the flange 47b of the support portion 47 is disposed on the outer side surface of the gear portion 45 in the axial direction, so that the body portion 47a of the support portion 47 can be easily positioned in the axial direction of the cam gear on the radially inward side of the gear portion 45. Moreover, since the first concave part 47c is disposed on the body portion 47a and the flange 47b, the gear portion 45 and the support portion 47 can be securely integrally rotated.

In the oscillating mechanism 30, by engaging the third protruding part 45e of the gear portion 45 with the second concave part 47d of the support portion 47, the gear portion 45 and the support portion 47 can be integrally rotated with a simple configuration.

In the oscillating mechanism 30, the flange 47b of the support portion 47 is disposed on the outer side surface of the gear portion 45 in the axial direction, so that the body portion 47a of the support portion 47 can be easily positioned in the axial direction of the cam gear on the radially inward side of the gear portion 45. Further, since the second concave part 47d is provided on the body portion 47a, the gear portion 45 and the support portion 47 can be securely integrally rotated.

In the oscillating mechanism 30, the gear portion 45 contains zinc, so that strength and rigidity of the cam gear 33 can be secured. In the oscillating mechanism 30, the support portion 47 contains polyoxymethylene resin and/or polyacetal resin, so that the weight of the cam gear 33 can be suitably reduced.

By configuring the oscillating mechanism 30 as described above, the weight of the spinning reel 1 can be suitably reduced.

The present disclosure can be used for the oscillating mechanism of a spinning reel and for a spinning reel.

What is claimed is:

1. An oscillating mechanism for a spinning reel that moves a spool shaft in a spool shaft direction in conjunction with a rotation of a handle shaft, comprising:
   a sliding gear configured to rotate in conjunction with the rotation of the handle shaft;
   a cam gear having a gear portion formed from metal that includes a gear body configured to mesh with the sliding gear and a boss protruding from the gear body, and a resin support portion supporting a radially inward side of the gear portion and configured to rotate integrally with the gear portion; and
   a slider mounted on the spool shaft and including an engagement groove in which the boss is configured to engage and which is configured to move the spool shaft in the spool shaft direction by moving the boss along the engagement groove,
   the gear portion including a first engagement part configured to engage the support portion and the boss extending from the first engagement part in an axial direction of the cam gear.

2. The oscillating mechanism for a spinning reel according to claim 1, wherein
   the gear portion includes zinc.

3. The oscillating mechanism for a spinning reel according to claim 1, wherein
   the support portion includes a polyoxymethylene resin or a polyacetal resin.

4. A spinning reel, comprising:
   the oscillating mechanism according to claim 1;
   a reel body;
   the spool shaft supported so as to be movable in a front-rear direction with respect to the reel body; and
   the handle shaft supported so as to be rotatable with respect to the reel body.

5. An oscillating mechanism for a spinning reel that moves a spool shaft in a spool shaft direction in conjunction with a rotation of a handle shaft, comprising:
   a sliding gear configured to rotate in conjunction with the rotation of the handle shaft;
   a cam gear having a gear portion formed from metal that includes a gear body configured to mesh with the sliding gear and a boss protruding from the gear body, and a resin support portion supporting a radially inward side of the gear portion and configured to rotate integrally with the gear portion; and
   a slider mounted on the spool shaft and including an engagement groove in which the boss is configured to engage and which is configured to move the spool shaft in the spool shaft direction by moving the boss along the engagement groove,
   the gear portion including a first engagement part protruding radially inwardly from the gear body, and
   the support portion including a first concave part that opens radially outwardly and with which the first engagement part is configured to engage.

6. The oscillating mechanism for a spinning reel according to claim 5, wherein
   the boss protrudes from the first engagement part in an axial direction of the cam gear.

7. The oscillating mechanism for a spinning reel according to claim 5, wherein the support portion has a body portion disposed on the radially inward side of the gear portion and supporting the gear portion, and a flange extending radially outwardly from the body portion and disposed on an outer side surface of the gear portion in an axial direction, and the first concave part is disposed on the body portion and the flange.

8. The oscillating mechanism for a spinning reel according to claim 5, wherein the gear portion includes a first engagement part protruding radially inwardly from the gear body, and the support portion includes a second concave part opening radially outwardly and with which a second engagement part is configured to engage.

9. The oscillating mechanism for a spinning reel according to claim 8, wherein the support portion has a body portion disposed on the radially inward side of the gear portion and supporting the gear portion, and a flange extending radially outwardly from the body portion and disposed on an outer side surface of the gear portion in an axial direction, and the second concave part is disposed on the body portion.

\* \* \* \* \*